Aug. 15, 1961 P. A. BYGDNES 2,996,264

SPRING TORQUE TAPE TRANSPORT SYSTEM

Filed Sept. 25, 1959 2 Sheets-Sheet 1

INVENTOR.
PERRY A. BYGDNES
BY
Flehr & Swain
ATTORNEYS

INVENTOR.
PERRY A. BYGDNES
BY
Flehr & Swain
ATTORNEYS

United States Patent Office 2,996,264
Patented Aug. 15, 1961

2,996,264

SPRING TORQUE TAPE TRANSPORT SYSTEM

Perry A. Bygdnes, Redwood City, Calif., assignor to Ampex Corporation, Redwood City, Calif., a corporation of California Filed Sept. 25, 1959, Ser. No. 842,332
6 Claims. (Cl. 242—55.14)

This invention relates to spring torque tape transport systems and more particularly to a spring torque tape system which includes means for maintaining substantially constant tension in the tape, film, or other similar media.

In using web type media for the recording and reproduction of intelligence, the web is usually driven at a constant speed past the transducing element by a capstan drive. The tension on the two sides of the drive should be relatively constant, for changes in tension may be reflected in changes of linear velocity of the web element. Constant torque is also required to prevent tape breakage as well as excess tape loops.

Thus, special means are required to maintain constant the torque supplied to the drives for the supply and take-up reels. Since the supply stack for the web material has a continuously decreasing radius, and the take-up stack has a continuously increasing radius, a constant speed motor is not suitable.

Systems of the prior art have used constant torque motors for maintaining substantially constant tension, or have employed conical pulleys driven by belts in order to provide the required constant tension. Such systems, in addition to being expensive and complex, are continuously in need of adjustment.

It is, therefore, an object of the present invention to provide a simplified tape reel drive system.

It is another object of the present invention to provide a tape reel drive system whereby conventional torque motors and the like are not required.

It is a further object of this invention to provide an improved spring torque motor for web supply reels wherein the torque between the supply and take-up reels remains substantially constant.

These and other objects of the invention will become more clearly apparent from the following description when taken in conjunction with the accompanying drawing.

Referring to the drawing.

Figures 1, 2:
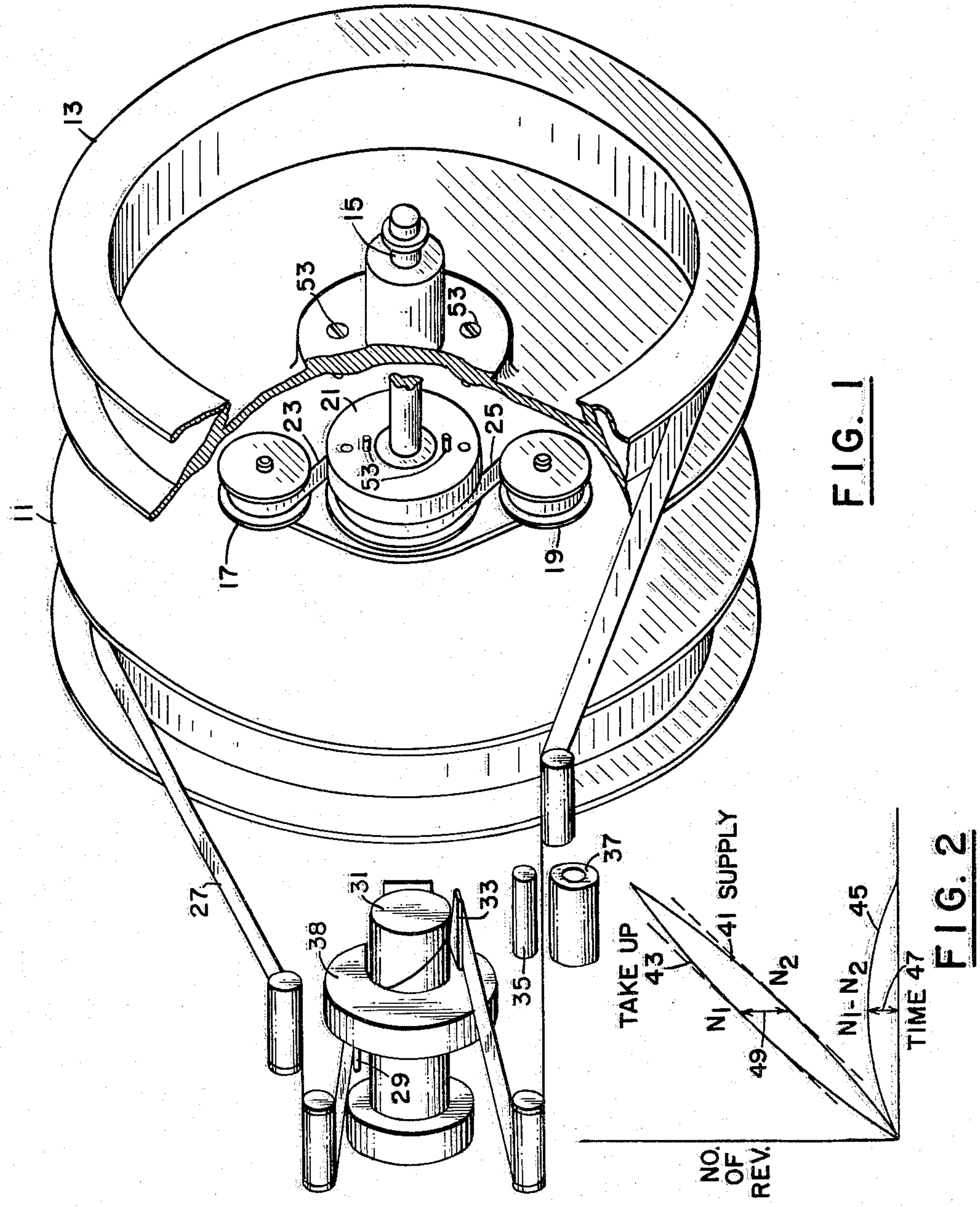
FIGURE 1 is a perspective view, partially cut away, of a tape transport system utilizing an embodiment of the invention.
FIGURE 2 is a plot showing the rotational difference between supply and take-up reel in a system such as that in FIGURE 1.

Referring to FIGURE 1, two tape reels 11 and 13 are rotatably mounted on a shaft 15. The reel 11 serves as a supply reel for the tape system while the reel 13 serves as a takeup reel. Rotatably attached to the supply reel 11 are two spring drums 17 and 19. Freely rotatable about the shaft 15 and firmly attached to the take-up reel 13 is a spring motor hub 21. The springs 23 and 25 are wrapped in a bifilar manner about the hub 21, and are individually wrapped about the spring drums 17 and 19, respectively. In the embodiment illustrated, the tape 27 extends from the stack on the supply reel 11, past a guide 29 and spirally around a cylindrical guide 31, to a second guide 33. The tape is then threaded past a drive capstan 35 and idler 37 to the take-up reel 13.

The drive capstan 35 serves to drive the tape past the transducing head assembly 38 which, as illustrated, may be of the rotating type such as disclosed in copending application Serial No. 822,628, filed June 24, 1959. It is, of course, apparent that by providing suitable guides, the head assembly may be a stationary head over which the tape moves at a constant linear velocity.

As the capstan pulls the tape off the supply reel, it causes the reel to rotate. Rotation of the supply reel serves to cause the spring drums 17 and 19 to rotate and to transmit torque through the springs 23 and 25 to the hub 21 which, in turn, drives the take-up reel to take up the tape from the capstan. Operation of the spring torque motor will be presently described.

Since the original diameter of the stack on the supply reel 11 decreases and the stack of tape on the take-up reel 13 increases during the operation of the system, the rotational velocity of the two reels 11 and 13 are by necessity of different velocities. For this reason, a common shaft drive is impossible for use in the system.

Referring to FIGURE 2, there is graphically illustrated the difference in rotation of the supply and take-up reels due to the inequality of the tape stacks. The curve 41 shows a plot of the number of revolutions of the supply reel as against a lapsed period of time while the curve 43 shows the number of revolutions of the take-up reel as against a lapsed period of time. The curves here assume the supply and take-up reel each have the same empty diameter and that the system is operated until the supply reel is empty. Using these curves as a basis, it becomes apparent that the difference in rotation between the reels is zero at the beginning and at the end of the operation, and is at a maximum at the midpoint of the operation. This difference in number of rotations is shown graphically by the curve 45 where the maximum 47 is the equivalent of the difference between the curves 43 and 41 as shown at 49.

Although the beginning and the end of the curve 45 will always be zero under the conditions given above, the maximum 47 will vary widely, dependent upon the thickness of the stack of tape to be transported. It is apparent that the thicker the stack, the more variation there is between the supply reel speed and take-up reel speed and, consequently, the greater variation in the difference of revolutions as plotted against time.

In order to obtain a zero difference in revolutions as plotted against time, the tape stack could consist of only one winding of tape. This, of course, would require an extremely large diameter tape reel for normal application.

Figure 3:
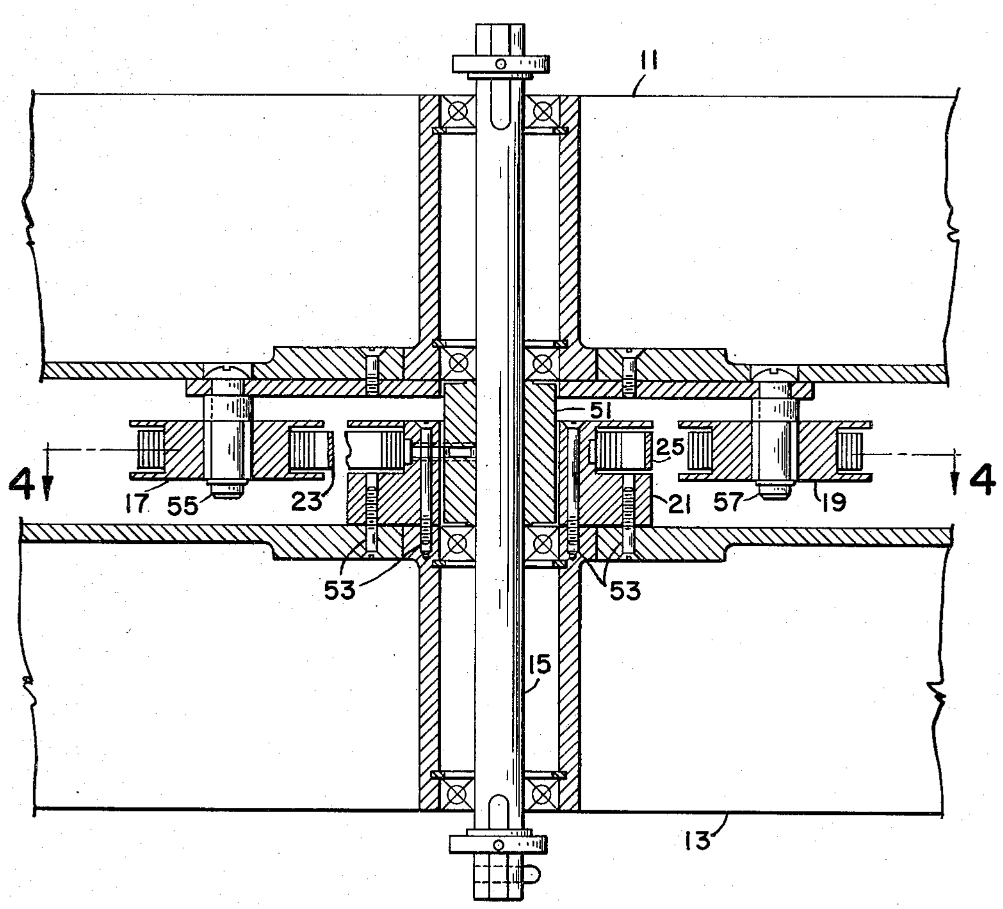
FIGURE 3 is a sectional view of the system shown in FIGURE 1.
Figure 4:
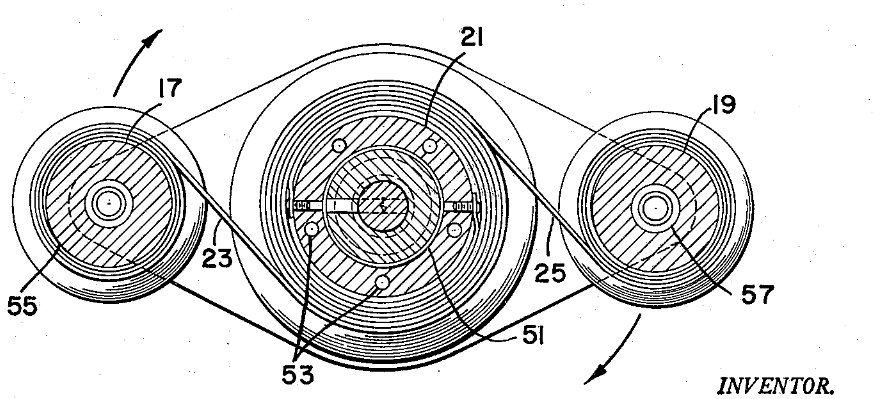
FIGURE 4 is a sectional view along the line 4—4 of FIGURE 3.

Assuming that reasonable size reels are to be utilized, the system must be capable of compensating for the difference in rotation of the reels. The invention may be shown more clearly with simultaneous reference to FIGURES 3 and 4. The supply reel 11 and take-up reel 13 are freely rotatable about the shaft 15. Rigidly attached to the shaft 15 is the separation bushing 51 about which the hub 21 freely rotates. The spring motor 21 is firmly attached to the take-up reel 13 by means of the screws 53. The spring drums 17 and 19 are freely rotatable about the spring drum shafts 55 and 57, respectively, which are both rigidly attached to the supply reel 11. The springs 23 and 25 are both wound in the same direction about the spring motor hub 21, and upon the spring drums 17 and 19 in opposite directions.

In preparation for operation, both of the springs 23 and 25 are wound about the hub 21, leaving approximately one and one-half turns of the spring on each of the drums 17 and 19. This minimum number of revolutions of the spring on the drums 17 and 19 provide for gripping friction for the spring on those drums. The number of windings about the hub 21 must be at least as great as the maximum difference in revolutions as shown in FIGURE 2 at the curve 45. Although the device would be operable with a single spring and spring drum, two or more are used in order to provide balance throughout the system.

In operation, the tape is drawn from the supply reel by the drive capstan 35 (FIGURE 1), thereby providing rotation of the supply reel 11, about the shaft 15. Upon rotating the drum 11 and consequently the drums 17 and 19, in the direction shown by the arrows in FIGURE 4, the springs 23 and 25 will exert a rotating force on hub 21 thereby causing the drum and its rigidly attached take-up reel 13 to rotate with the supply reel 11. At the same time, the springs 23 and 25 will tend to wind upon their respective drums 17 and 19, and, consequently, unwind from the hub 21. This tendency to unwind from the hub 21 and onto the drums 17 and 19 is with a constant tension throughout the length of the spring. A constant difference in tension is required between the supply and the take-up reels to provide a smooth flow of tape therebetween. This constant tension is due to friction of the parts in the mechanism and of the tape about its idler and capstans. At the beginning of the operation, the supply reel requires fewer revolutions to dispense an amount of tape than the take-up reel requires to take up the same amount. During the first half of the operation, the tension of the springs 23 and 25, in their tendency to wrap upon their respective drums 17 and 19, cause additional rotation of the hub 21 about the axle 15. As the operation progresses, the difference in the number of revolutions between the supply and take-up reel increases to a maximum and subsequently begins to decrease. As the difference in number of revolutions begins to decrease, the supply reel reaches a point at which its velocity is higher than that required by the take-up reel. At this point, the springs 23 and 25 begin to unwind from their respective drums 17 and 19 and to become rewound upon the hub 21. This is accomplished by the constant tension in the springs themselves. When the tape transfer is completed, all the required tape is on the take-up reel 13, and the springs 23 and 25 are again fully wound upon the hub 21.

Although, in the embodiment shown, the supply and take-up reels are mounted coaxially, it will be apparent to those skilled in the art that other configurations are possible. One other embodiment would be to mount the reels side by side and utilize a belt to convey the torque from the hub 21 to the take-up reel 13.

Thus, it is seen that there is provided a magnetic tape apparatus in which the power for the supply and take-up reels is provided by the capstan through the tape. As the capstan draws tape from the supply reel, it causes the spring drive system to rotate the take-up reel to take up the tape. The spring drive system is such that there is substantially constant tension on the tape extending between the capstan and the supply reel and the tape extending between the capstan and the take-up reel. Thus, variations in tape speed due to varying tensions are minimized. The complete apparatus is relatively inexpensive to construct since it requires but a single drive motor. The various controls required for maintaining constant torque are eliminated.

I claim:

1. A tape transport system comprising a supply and a take-up reel, a spring drum rotatably and eccentrically attached to said supply reel, and having a constant torque spring partially wound thereabout, and a hub coaxially attached to said take-up reel, one end of said spring being wound about said hub.

2. A tape transport system comprising a supply and a take-up reel, a plurality of spring drums rotatably and eccentrically attached to said supply reel, each of said spring drums having a constant torque spring partially wound thereabout, a hub coaxially attached to said take-up reel, one end of each of said springs being wound about said hub, and drive means associated with the tape for exerting a rotational force on said supply reel.

3. A tape transport system comprising a supply and a take-up reel freely rotatable about a common axis, a spring drum rotatably and eccentrically attached to said supply reel, a constant torque spring partially wound about said drum, a hub coaxially attached to said take-up reel, one end of said spring being wound about said hub, and drive means associated with the tape for exerting a rotating force on said supply reel.

4. A tape transport system comprising a supply and a take-up reel coaxial with each other, a spring drum rotatably and eccentrically attached to said supply reel and having a constant torque spring partially wound thereabout, and a hub coaxially attached to said take-up reel, one end of said spring being wound about said hub.

5. A tape transport system comprising: first and second reels, a tape coiled partly on each reel and stretched tautly therebetween, a first drum mounted for axial rotation and connected to said first reel for rotation therewith, a second drum mounted for bodily rotation about the axis of said first drum and connected to said second reel for rotation therewith, and a constant torque spring wound partly on said first drum and partly on said second drum and loaded against the pull of said tape, whereby the rotation of one of said reels causes a differential rotation of the other reel.

6. A tape trapsport system comprising: a shaft, first and second reels coaxially mounted on said shaft, a sleeve coaxially mounted on said shaft and between said reels and functioning to space said reels apart, a hub coaxially mounted on said sleeve and having a connection to said first reel for rotation therewith, a spring drum eccentrically and rotatably mounted on said second reel and positioned in spaced relation to the periphery of said hub, a constant-torque spring having a naturally-coiled portion coiled on said drum and an outer distorted end portion extending to and reversely coiled on said hub with said end affixed to said hub, a magnetic tape coiled partly on each of said reels and having an extended portion stretched tautly between said reels against the loading of said spring, magnetic recording and playing means mounted in operating relation to said extended portion of said tape, and capstan drive means mounted to engage said extended portion of said tape, said capstan drive means being selectively operable in either direction of rotation for uncoiling said tape from either of said reels, whereby the other of said reels is operated by the rotation of said spring to take up and further coil said tape.

References Cited in the file of this patent

UNITED STATES PATENTS

| | | |
|---|---|---|
| 2,477,146 | Scherbatskoy | July 26, 1949 |
| 2,869,799 | Hunter | Jan. 20, 1959 |